Aug. 5, 1947.  C. H. FAY  2,425,180

MAGNETIC FIELD MEASUREMENTS

Filed Dec. 15, 1943

Inventor: Charles H. Fay

By his Attorney:

Patented Aug. 5, 1947

2,425,180

UNITED STATES PATENT OFFICE 2,425,180

MAGNETIC FIELD MEASUREMENTS

Charles H. Fay, Houston, Tex., assignor to Shell Development Company, San Francisco, Calif., a corporation of Delaware Application December 15, 1943, Serial No. 514,581

3 Claims. (Cl. 175—183)

This invention pertains to methods and apparatus for magnetic field measurements, such as are useful in the electromagnetic and related arts, such as geophysical exploration.

It is the object of this invention to provide a method and apparatus whereby the intensity of a magnetic field, the direction or sense thereof, and any variations therein, may be measured with great accuracy substantially without limitation as to the space wherein said measurements are effected.

It is also an object of this invention to provide a method and apparatus for magnetic field measurements wherein an electrical conductor element, such as a coil, is placed within a magnetic field, is set into mechanical oscillation at its natural resonance frequency, an electric current is produced and modified outside of said coil in response to and as a function of said oscillation, said current is fed to said coil, and said coil is maintained in a state of undamped mechanical oscillation at its natural frequency by the interaction between the current passing through the coil and the magnetic field under measurement, a value derived from the ratio of the current necessary to maintain said coil in oscillation at a certain amplitude to said amplitude giving a measure of the intensity of said field.

Figure 1:
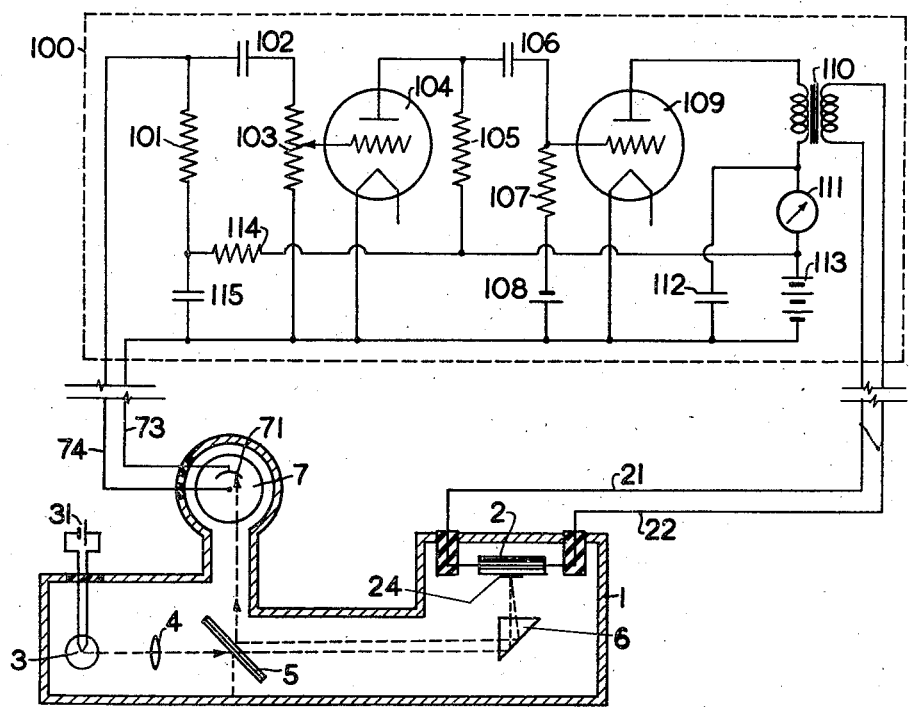
Figure 2:
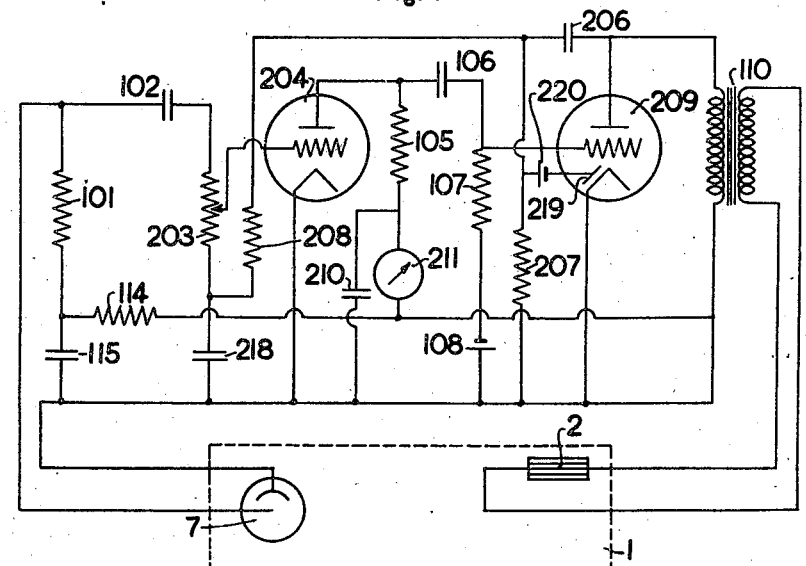

These and other objects of this invention will be understood from the following description, taken with reference to the attached drawings, wherein:

Fig. 1 is a diagrammatic view of the present field-sensitive or detector element and of its electrical circuit, and Fig. 2 is a view of a modification of the system of Fig. 1.

Referring to Fig. 1, a housing 1 contains a vibrator 2, consisting of a coil similar to that of a taut suspension oscillograph galvanometer element. Wire 21 and 22 serve both to support said coil, and to pass an electric current therethrough. The coil 2 is provided with a mirror 24 attached thereto.

The housing 1 also contains and supports an optical system, schematically shown in the drawing as comprising a light source, such for example as a line-filament lamp 3, supplied with electric current from any suitable source 31, a lens 4, a half-silvered mirror 5, and a totally reflecting prism 6. A beam of light, passing from the source 3 through the lens 4, and the semi-transparent mirror 5, is directed by the prism to the coil mirror 24, and is reflected back, along a path comprising the prism 6 and the semi-reflecting mirror 5, to the cathode 71 of a photoelectric cell 7, as shown in Fig. 1. It is understood that although a particular geometrical arrangement of the prism 6 with regard to the axis of rotation of the coil 2 is shown in Fig. 1 to trace clearly in one drawing both the light train and the electrical connections pivoting the coil 2, a different geometrical arrangement of these elements with regard to each other may be used in practice, for example, one where the axis of rotation (about the wires 21—22) of the coil 2 is at right angles to that shown in Fig. 1.

It will be obvious from the above that the optical system comprising the reflecting vibrator will cause, upon a rotatory displacement of the latter about its axis, a varying amount of light to impinge upon the cathode 71 of the photocell 7, and thus will produce a varying component of photocell current, and consequently of the voltage across an external load resistance or suitable circuit connected to the electrodes of the photocell, which varying voltage will be proportional to the angular displacement of the vibrator coil 2.

The construction of the housing 1 is preferably such as to allow the vibrator 2 to be inserted into relatively small spaces for the purpose of measuring magnetic fields therein. Thus, the end of the housing containing the vibrator may be given an elongated rectangular or cylindrical shape with the dimensions in the vertical direction of the paper and in the direction at right angles to the plane of the paper kept at small values. Other constructions can, however, equally well be used, particularly where no restrictions as to space exist.

The electrical circuit connected to the photocell 7 and the vibrator 2 by leads 73—74 and 21—22 respectively, may be accommodated, if desired, within a separate housing, schematically shown by the dotted line 100. The photocell 7 is coupled, by means of a resistor 101, a condenser 102, and a calibrated attenuator 103 to the grid of a voltage amplifier electron tube 104. It is understood that although all tubes are shown in the drawings as triodes for simplicity, any other type of tubes, for example, multi-grid tubes such as pentodes, may be used when desired for the purposes of this invention.

The plate of tube 104 is coupled, by means of resistor 105, condenser 106 and resistor 107, to the grid of the output amplifier tube 109, a cell or battery 108 providing a suitable grid bias for said tube. The plate of tube 109 is coupled by means of an output transformer 110 to the vibrator 2. An indicating device, such as a milliammeter 111, measures the D. C. component of the plate current of tube 109, the A. C. component being by-passed by condenser 112. A battery 113 supplies the necessary plate voltage to tubes 104 and 109. A resistor 114 and condenser 115 may be used to prevent feedback into the amplifier input due to the common impedance of the battery 113.

The operation of the present system is as follows: Assuming that the vibrator 2 is somehow set in motion (which, it may be remarked, takes place automatically, due to the mechanical oscillation of the vibrator caused by any displacement of the detector housing 1), said vibrator would oscillate in damped harmonic motion at its mechanical resonance frequency, were it not connected to transformer 110. The photocell 7, however, converts the angular displacement of the vibrator into a voltage, as described above, which voltage is amplified and shifted in phase by the amplifier circuit. The resulting current supplied to the vibrator through the transformer 110 will result in a corresponding torque on the vibrator if the latter is in a magnetic field having a component in the plane of the vibrator at right angles to its axis of rotation. If the phase shift of the amplifier circuit is correct, and the field component has a sufficient value and is in the proper direction, this torque will tend to drive the vibrator coil at its mechanical resonance frequency, that is, the system will constitute a feed-back oscillator, as will be readily understood by those familiar with electronics.

It can be shown that, for optimum operation, the amplifier phase shift should be 90 degrees, under which condition the system will operate at the undamped mechanical resonance frequency of the coil; however, considerable deviations from the optimum phase shift are permissible. The phase shift may be adjusted to the desired approximately correct value, for example, by a proper selection of the capacitances of condensers 102 and 106.

Since the amplitude of vibration of the vibrator coil at its resonant frequency for a constant alternating current input is proportional to the component of the magnetic field intensity in the plane of the vibrator normal to its axis, the voltage gain ratio of the amplifier required just to maintain oscillation is inversely proportional to this field intensity component. The system illustrated in Fig. 1 can, therefore, be used to measure said component by adjusting the calibrated attenuator 103 until the system just oscillates. If the tube 109 is properly biased, a small change in the reading of milliammeter 111, due to plate rectification in tube 109 may be used as an indication of oscillation. It is understood, however, that an output meter or other means of detecting the presence of an A. C. amplifier output may be used as an indicator in making the adjustment of attenuator 103. The setting of attenuator 103 thus serves as a measure of the magnetic field component in the plane of the vibrator normal to its axis. The sense or direction of the component is also determined, since the system oscillates only when the sense is correct, a reversal of the sense making the feedback degenerative. If the vibrator is incorrectly oriented with regard to the sense of the field component which it is desired to measure, the proper conditions for oscillation may be established by turning the axis of coil 2 through 180 degrees, or reversing the connections of the leads 21 and 22.

It is obvious that if the present device is calibrated in a single magnetic field of known intensity, the value of an unknown field can be determined from the setting of the attenuator 103.

Fig. 2 shows a modification of the above system, wherein the manual adjustment of the amplifier gain is replaced by an automatic control. The detector element within the housing 1, being identical with that of Fig. 1, is schematically indicated in Fig. 2 only by its essential coil and photocell elements 2 and 7, while in the amplifier circuit all elements similar to or operating in a similar manner with corresponding elements of Fig. 1 are likewise indicated by the same numerals.

Tube 204 is a tube having so-called super-control or remote cutoff characteristics, that is, its gain as a voltage amplifier can be controlled by varying its grid bias, for example, its gain may be reduced by making its grid more negative.

The output tube 209 is a multi-electrode tube, such as a diode-pentode or a diode-triode tube, as shown in Fig. 2, and contains, besides an amplifying section, a diode section comprising a rectifying electrode 219. It is obvious, however, that the multi-electrode tube 209 may be replaced by an ordinary amplifier tube used in conjunction with a separate rectifier, in a manner well understood in electronics engineering.

The diode section of tube 209 is provided with a load resistance 207, and is coupled to the plate of tube 209 by means of a condenser 206. Said diode section may be biased by a battery 220 if desired, in order to provide what in radio engineering is termed a delayed automatic volume control. The diode section of tube 209 provides a grid bias for the tube 204 through a low pass filter comprising a resistor 208 and a condenser 218, which filter serves to reduce to a negligible value the alternating component or portion of the diode potential.

It will be obvious from the above description that the circuit of Fig. 2 serves, in a manner similar to that of automatic volume control circuits, to adjust automatically the amplifier gain of the system to the value required for stable oscillation without amplifier overloading. The indicator or milliammeter 211 serves to measure the D. C. component of the plate current of tube 204, which depends on the grid bias and hence on the gain of that tube. The indications of said milliammeter can therefore be used, after suitable calibration, to measure the magnetic field component actuating the coil 2. The range of the system shown in Fig. 2 can be readily extended by providing additional manual stepwise adjustment means for the amplifier gain, comprising, for example, a voltage attenuator 203.

As already stated, the present invention has been described hereinabove in its simplest terms, and nothing in said description should therefore be taken as imposing any restrictions with regard to the type of electronic tubes or number of amplification stages used, or with regard to any other modification which may be obvious to those skilled in the art of electronics.

I claim as my invention:

1. A system for magnetic field measurements, comprising a coil, means pivoting said coil for oscillation in said field, a light source, a photoelectric element, optical means carried by the coil for varying the illumination of the photo-electric element by the light source proportionally to the oscillation of the coil, a circuit comprising variable gain ratio amplifier means energized by the output of said photo-electric element, means for passing the output current of said circuit through said coil, and indicator means in said circuit for indicating a value proportional to the gain ratio of said amplifier means necessary for just maintaining said coil in oscillation by the reaction of the current passed therethrough with the magnetic field in which the coil oscillates.

2. A system for magnetic field measurements comprising a coil, means pivoting said coil for oscillation in said field, a light source, a photoelectric element, optical means carried by the coil for varying the illumination of the photoelectric element proportionally to the oscillation of the coil, a circuit comprising amplifier means energized by the output of the photo-electric element, adjustable means in said circuit for varying the amplification gain ratio of said amplifier means, means for passing the output current of said circuit through said coil, and indicator means in said circuit for indicating a value proportional to the gain ratio necessary for just maintaining the coil in oscillation by the reaction of the current passed therethrough with the magnetic field in which the coil oscillates.

3. A system for magnetic field measurements comprising a coil, means pivoting said coil for oscillation in said field, a light source, a photoelectric element, optical means carried by the coil for varying the illumination of the photo-electric element proportionally to the oscillation of said coil, a circuit comprising amplifier means energized by the output of said photo-electric element, said amplifier means having grid control means for varying the amplification gain thereof, rectifier means connected to the output of said amplifier means in said circuit for rectifying a portion of the output of said amplifier means, means for passing the non-rectified portion of said amplifier output through said coil, means for applying the rectified portion of said amplifier output to said grid control means to bias said amplifier means, whereby the gain ratio of said amplifier means is kept at a value necessary for just maintaining said coil in oscillation by the reaction of the current passed therethrough with the magnetic field in which the coil oscillates, and indicator means in said circuit for indicating a value proportional to said gain ratio.

CHARLES H. FAY.

REFERENCES CITED

The following references are of record in the file of this patent:

UNITED STATES PATENTS

| Number | Name | Date |
| --- | --- | --- |
| 1,863,415 | Rieber | June 14, 1932 |
| 1,938,184 | Kwarten | Dec. 5, 1933 |
| 2,054,672 | Edgar | Sept. 15, 1936 |
| 2,147,492 | Mead, Jr. | Feb. 14, 1939 |
| 1,831,744 | Laurent | Nov. 10, 1931 |
| 2,220,788 | Lohman | Nov. 5, 1940 |

FOREIGN PATENTS

| Number | Country | Date |
| --- | --- | --- |
| 397,167 | Great Britain | Aug. 14, 1933 |